(12) United States Patent
Oono et al.

(10) Patent No.: US 9,669,681 B2
(45) Date of Patent: Jun. 6, 2017

(54) VEHICLE HEAT EXCHANGER

(71) Applicant: DENSO CORPORATION, Kariya, Aichi-pref (JP)

(72) Inventors: Shingo Oono, Chiryu (JP); Shota Akagi, Okazaki (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 196 days.

(21) Appl. No.: 14/650,580

(22) PCT Filed: Dec. 10, 2013

(86) PCT No.: PCT/JP2013/007256
§ 371 (c)(1),
(2) Date: Jun. 9, 2015

(87) PCT Pub. No.: WO2014/091746
PCT Pub. Date: Jun. 19, 2014

(65) Prior Publication Data
US 2015/0306934 A1 Oct. 29, 2015

(30) Foreign Application Priority Data

Dec. 11, 2012 (JP) .................................. 2012-270640
Dec. 2, 2013 (JP) .................................. 2013-249399

(51) Int. Cl.
*F28D 1/00* (2006.01)
*B60H 1/00* (2006.01)
(Continued)

(52) U.S. Cl.
CPC ..... *B60H 1/00328* (2013.01); *B60H 1/00335* (2013.01); *B60K 11/04* (2013.01);
(Continued)

(58) Field of Classification Search
CPC ............ B60H 1/00328; B60H 1/00335; F28D 1/0452; F28D 1/05391; F28D 9/0224; F28D 2210/08; B60K 11/04
(Continued)

(56) References Cited

U.S. PATENT DOCUMENTS 6,182,744 B1 2/2001 Nakamura et al.
6,789,613 B1 9/2004 Ozaki et al.
(Continued)

FOREIGN PATENT DOCUMENTS

JP H04133820 A 5/1992
JP H11105538 A 4/1999
(Continued)

OTHER PUBLICATIONS

International Search Report and Written Opinion (in Japanese with English Translation) for PCT/JP2013/007256, mailed Mar. 4, 2014; ISA/JP.

*Primary Examiner* — Davis Hwu
(74) *Attorney, Agent, or Firm* — Harness, Dickey & Pierce, P.L.C.

(57) ABSTRACT

A vehicle heat exchanger includes a low-temperature side radiator, a condenser, and a high-temperature side radiator, which are aligned in an airflow direction and are integrated together. The low-temperature side radiator includes an inflow portion and an upper path, which are located in an upper portion thereof. In addition, the low-temperature side radiator includes a lower path and an outlet portion, which are located in a lower portion thereof and communicate with the upper path. A subcooler of the condenser overlaps, in the airflow direction, with at least a part of the lower path of the low-temperature side radiator. As a result, thermal influence by the low-temperature side radiator on the subcooler of the condenser can be reduced.

17 Claims, 10 Drawing Sheets

(51) Int. Cl.
  *B60K 11/04* (2006.01)
  *F28F 9/02* (2006.01)
  *F28D 1/04* (2006.01)
  *F28D 1/053* (2006.01)
  *F01P 3/18* (2006.01)
(52) U.S. Cl.
  CPC ....... *F28D 1/0452* (2013.01); *F28D 1/05391* (2013.01); *F28F 9/0224* (2013.01); *F01P 2003/182* (2013.01); *F28F 2210/08* (2013.01)
(58) Field of Classification Search
  USPC .......................................... 165/148, 104.11
  See application file for complete search history.

(56) References Cited

U.S. PATENT DOCUMENTS

| | | | |
|---|---|---|---|
| 2006/0265874 A1 | 11/2006 | Hashimoto et al. | |
| 2009/0020263 A1* | 1/2009 | Ohsawa | F28D 1/0435 165/104.11 |
| 2009/0078220 A1* | 3/2009 | Meyer | F01P 7/165 123/41.31 |
| 2009/0301411 A1* | 12/2009 | Iwasaki | B60H 1/00328 123/41.23 |
| 2009/0314266 A1 | 12/2009 | Hori et al. | |
| 2012/0118543 A1* | 5/2012 | Ninagawa | F28D 1/05366 165/148 |

FOREIGN PATENT DOCUMENTS

| | | |
|---|---|---|
| JP | 2001041606 A | 2/2001 |
| JP | 2001059420 A | 3/2001 |
| JP | 2002107094 A | 4/2002 |
| JP | 2006329578 A | 12/2006 |
| JP | 2008038891 A | 2/2008 |
| JP | 2008056152 A | 3/2008 |
| JP | 2010018151 A | 1/2010 |

* cited by examiner

VEHICLE HEAT EXCHANGER

CROSS-REFERENCE TO RELATED APPLICATIONS

This application is a U.S. National Phase Application under 35 U.S.C. 371 of International Application No. PCT/JP2013/007256 filed on Dec. 10, 2013 and published in Japanese as WO 2014/091746 A1 on Jun. 19, 2014. This application is based on and claims the benefit of priority from Japanese Patent Application Nos. 2012-270640 and 2013-249399 filed on Dec. 11, 2012 and Dec. 2, 2013, respectively. The entire disclosures of all of the above applications are incorporated herein by reference.

TECHNICAL FIELD

The present disclosure relates to a vehicle heat exchanger.

BACKGROUND ART

A vehicle heat exchanger which includes, in addition to a high-temperature side radiator used for cooling an internal combustion engine (an engine), a low-temperature side radiator used for cooling an inverter for controlling a drive motor or cooling a supercharger, such as a turbocharger, is known conventionally. A vehicle heat exchanger disclosed in, for example, Patent Literature 1 includes, in addition to the high-temperature side radiator described above, a low-temperature side radiator used for cooling an inverter for controlling a drive motor. In the configuration disclosed in Patent Literature 1, in addition to the high-temperature side radiator and the low-temperature side radiator described above, a condenser used for a refrigeration cycle is provided in parallel. The high-temperature side radiator, the low-temperature side radiator, and the condenser are integrated and constitute an Engine Cooling Module (ECM), to improve mounting properties when mounting onto a vehicle. In the configuration disclosed in Patent Literature 1, the inverter increases the temperature of the coolant, and the coolant is supplied from the lower portion of the low-temperature side radiator to the low-temperature side radiator. Then, the coolant, which is subjected to heat exchange with air and is cooled, flows out from the upper portion of the low-temperature side radiator.

PRIOR ART LITERATURE

Patent Literature

Patent Literature 1: JP 11-105538 A

SUMMARY OF INVENTION

An example of a condenser includes a subcooling condenser in which a condensation portion, a receiver, and a subcooler are integrated. In the condensation portion of the subcooling condenser, a refrigerant is cooled by being subjected to heat exchange with air. In the receiver, the refrigerant which is cooled is subjected to gas-liquid separation. In the refrigerant subjected to gas-liquid separation, liquid-phase refrigerant flows into the subcooler, and then is again subcooled by being subjected to heat exchange with air. The subcooling condenser includes the subcooler, as described above, and thus the subcooling condenser has a high cooling performance.

Here, the configuration disclosed in Patent Literature 1 is applied to the subcooling condenser. In this case, the subcooler, which is located in the lower portion of the subcooling condenser, overlaps, in the airflow direction, with a lower portion of the low-temperature side radiator that receives coolant in a high-temperature state. Accordingly, there is a concern that heat generated by the low-temperature side radiator may be transmitted to the subcooler, and thus subcooling of the refrigerant may not be sufficiently performed.

The present disclosure is made in consideration of the problem described above. An object of the present disclosure is to provide a vehicle heat exchanger in which thermal influence of a low-temperature side radiator on a subcooler condenser can be reduced.

Means for Solving Problem

According to the present disclosure, in order to achieve the above object(s), the following technical matters are used. In one of the present disclosure, there is provided a vehicle heat exchanger including a low-temperature side radiator that exchanges heat between a coolant and air to cool the coolant, a condenser that exchanges heat between a refrigerant of a refrigeration cycle and the air to cool the refrigerant, and a high-temperature side radiator that exchanges heat between a coolant and the air to cool the coolant, the coolant having a higher temperature than the coolant that is cooled by the low-temperature side radiator, where the low-temperature side radiator, the condenser, and the high-temperature side radiator are aligned in an airflow direction such that the air for heat exchange passes therethrough, the low-temperature side radiator includes an inflow portion into which the coolant flows, an upstream path, the coolant flowing, from the inflow portion into the upstream path, to pass through the upstream path, the upstream path cooling the coolant by exchanging heat between the coolant and the air, a downstream path that is located downstream, in a coolant flowing direction, from the upstream path, the downstream path exchanging heat between the coolant, which passed through the upstream path, and the air to further cool the coolant, and an outlet portion, the coolant, which passed through the downstream path, flowing out of the outlet portion, the condenser includes a condenser core that exchanges heat between the refrigerant and the air to cool the refrigerant, and a subcooler that is located downstream, in a refrigerant flowing direction, from the condenser core, the subcooler exchanging heat between the refrigerant, which passed through the condenser core, and the air to subcool the refrigerant, and the subcooler overlaps, in the airflow direction, with at least a portion of the downstream path.

According to the disclosure described above, the low-temperature side radiator forms the coolant flow channel in which coolant flows through the inflow portion, the upstream path, the downstream path, and the outlet portion, in this order. Furthermore, the subcooler of the condenser overlaps, in the airflow direction, with at least a part of the downstream path of the low-temperature side radiator. In the low-temperature side radiator of the configuration described above, the coolant which passes through the upstream path and is cooled passes through the downstream path and air which is subjected to heat exchange with at least a part of the downstream path passes through the subcooler. Accordingly, thermal influence, on the subcooler of the condenser core, of the downstream path of the low-temperature side radiator can be reduced.

In one of the present disclosure, there is provided vehicle heat exchanger including a low-temperature side radiator that exchanges heat between a coolant and air to cool the coolant, a condenser that exchanges heat between a refrigerant of a refrigeration cycle and the air and to cool the refrigerant, and a high-temperature side radiator that exchanges heat between a coolant and the air to cool the coolant, the coolant having a higher temperature than the coolant that is cooled by the low-temperature side radiator, where the low-temperature side radiator, the condenser, and the high-temperature side radiator are aligned in an airflow direction such that the air for heat exchange passes therethrough, the low-temperature side radiator includes an inflow portion that is located in an upper portion of the low-temperature side radiator, an upper path that is in communication with the inflow portion, the upper path constituting a coolant flow channel and exchanging heat between the coolant and the air to cool the coolant, a lower path that is located below the upper path, the lower path constituting a coolant flow channel and exchanging heat between the coolant, which passed through the upper path, and the air to further cool the coolant, and an outlet portion that is located in a lower portion of the low-temperature side radiator, the outlet portion in communication with the lower path, the condenser includes a condenser core that exchanges heat between the refrigerant and the air to cool and condense the refrigerant, thereby changing the refrigerant into liquid phase, and a subcooler that is located below the condenser core, the subcooler exchanging heat between the liquid-phase refrigerant, which flowed in from the condenser core, and the air to subcool the liquid-phase refrigerant, and the subcooler overlaps, in the airflow direction, with at least a portion of the lower path.

According to the disclosure described above, the low-temperature side radiator forms the coolant flow channel which is constituted of the inflow portion, the upper path, the lower path, and the outlet portion and extends from the upper side to the lower side. Furthermore, the subcooler of the condenser overlaps, in the airflow direction, with at least a part of the lower path of the low-temperature side radiator. In the low-temperature side radiator of the configuration described above, the coolant which passes through the upper path and is cooled passes through the lower path and air which is subjected to heat exchange with at least a part of the lower path passes through the subcooler. Accordingly, thermal influence, on the subcooler of the condenser core, of the lower path of the low-temperature side radiator can be reduced.

EMBODIMENTS FOR CARRYING OUT THE INVENTION

Figure 1:
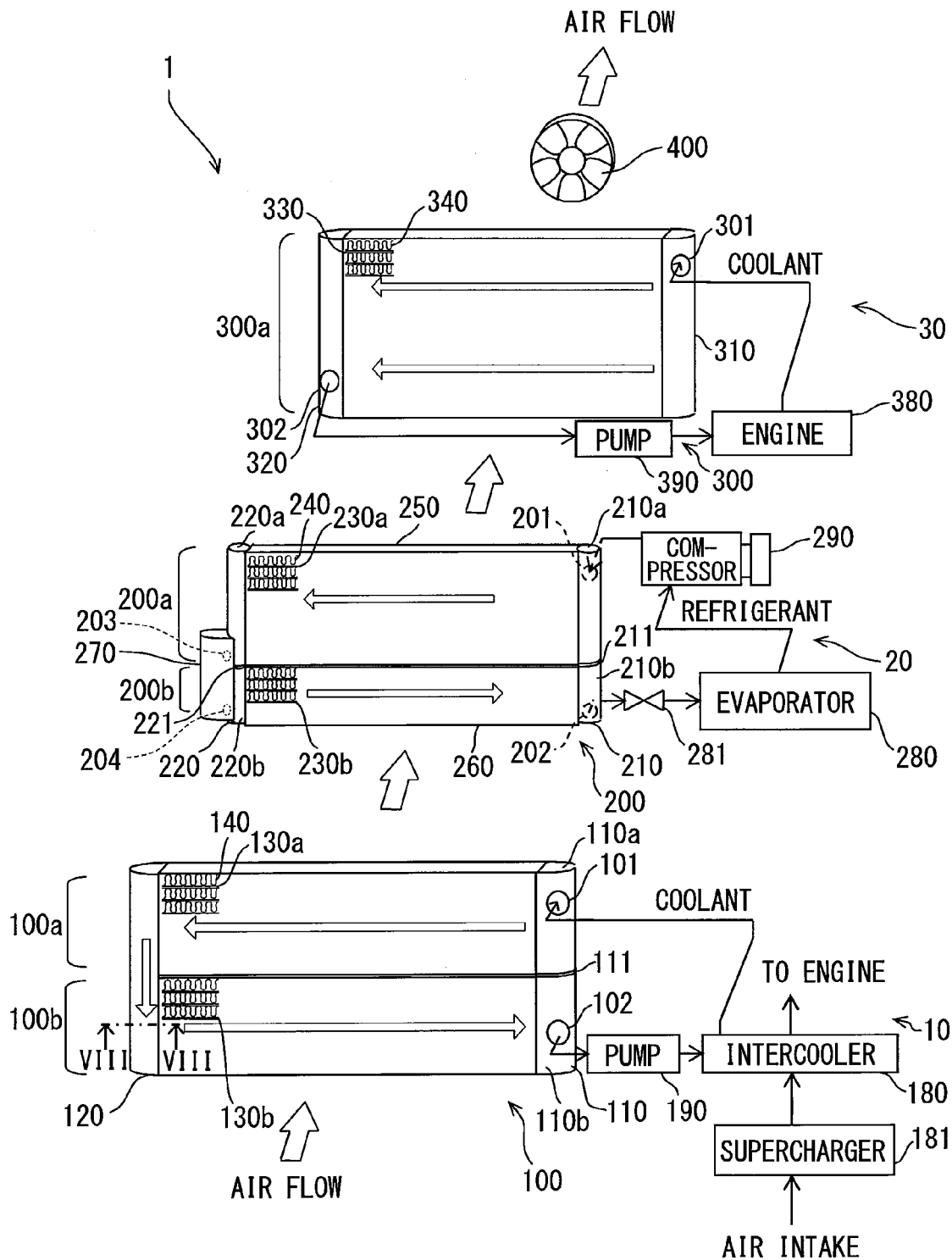
FIG. 1 is a perspective view illustrating a low-temperature side coolant cycle, a refrigeration cycle, and a high-temperature side coolant cycle according to a first embodiment applied to the present disclosure.

Hereinafter, a plurality of embodiments of the present disclosure will be described with reference to the accompanying drawings. In some cases, in the respective embodiments, the same reference numerals and letters are given to components of which the details are described in the preceding embodiment and the descriptions thereof will not be repeated. When, in the respective embodiments, a part of the configuration thereof is described, the configuration described in the preceding embodiment can be applied to the remaining parts. When, in the respective embodiment, it is specifically described that certain parts can be used in combination, the parts can be used in combination. However, without being limited thereto, even when there is no description in relation to combination, parts of the embodiments can be used in combination as long as there is no problem in combination.

First Embodiment

A first embodiment according to the present disclosure will be described. A vehicle heat exchanger 1 illustrated in FIG. 1 constitutes an Engine Cooling Module (ECM) and includes a low-temperature side radiator 100, a condenser 200, a high-temperature side radiator 300, and a fan 400. The vehicle heat exchanger 1 is mounted on a vehicle which includes an internal combustion engine (an engine 380), a supercharger 181 included in the engine 380, an intercooler 180 for cooling intake air which is compressed by the supercharger 181, and a refrigeration cycle 20 constituting a car air conditioner.

Next, the details of a low-temperature side coolant cycle 10, in which the intercooler 180, the low-temperature side radiator 100, and a low-temperature side pump 190 are connected to one another through piping to form a circuit, are described with reference to FIG. 1. The intercooler 180 performs heat exchange between intake air supercharged by the supercharger 181 and coolant to cool the intake air. The temperature of the coolant increases due to the heat exchange, and the coolant is supplied, by the intercooler 180, to the low-temperature side radiator 100. The low-temperature side radiator 100 performs heat exchange between the coolant and air to cool the coolant. The coolant, which is cooled in the low-temperature side radiator 100, is resupplied to the intercooler 180 by the low-temperature side pump 190. The coolant circulating in the low-temperature side radiator 100 is, for example, water having an ethylene-glycol-based antifreeze solution mixed therein.

The intake air, which is supercharged by the supercharger 181 and cooled by the intercooler 180, is supplied to the engine 380. The low-temperature side radiator 100 has a cross-flow structure in which coolant flows in a horizontal direction in the accompanying drawing and the coolant is subjected to heat exchange with air. Particularly, the low-temperature side radiator 100 according to the present embodiment has a U-turn cross-flow structure in which a coolant flow path reverses direction. In the U-turn cross-flow structure, coolant flows in through an inlet port (an inflow portion) 101 which is located at an upper right position in the accompanying drawing. Then, the coolant flows, to the left side in the horizontal direction of the accompanying drawing, through an upper path (an upstream path) 100a which is formed, as shown in the accompanying drawing, in the upper portion of the low-temperature side radiator 100. Then, the coolant reverses direction on the left side in the accompanying drawing. Next, the coolant flows, to the right side in the horizontal direction of the accompanying drawing, through a lower path (a downstream path) 100b which is formed, as shown in the accompanying drawing, in the lower portion of the low-temperature side radiator 100. Then, the coolant flows out through an outlet port (an outlet portion) 102 which is located at a lower right position in the accompanying drawing. In the U-turn cross-flow structure, a long path through which coolant flows in the low-temperature side radiator 100 can be ensured, and thus the heat exchange between the coolant and air is effectively performed. The upper path 100a is an upstream path into which the coolant flows after entering the inlet port 101. The lower path 100b is disposed on a downstream side of the upper path 100a and is a downstream path. After flowing through the upper path 100a, the coolant flows through the lower path 100b.

Figure 4:
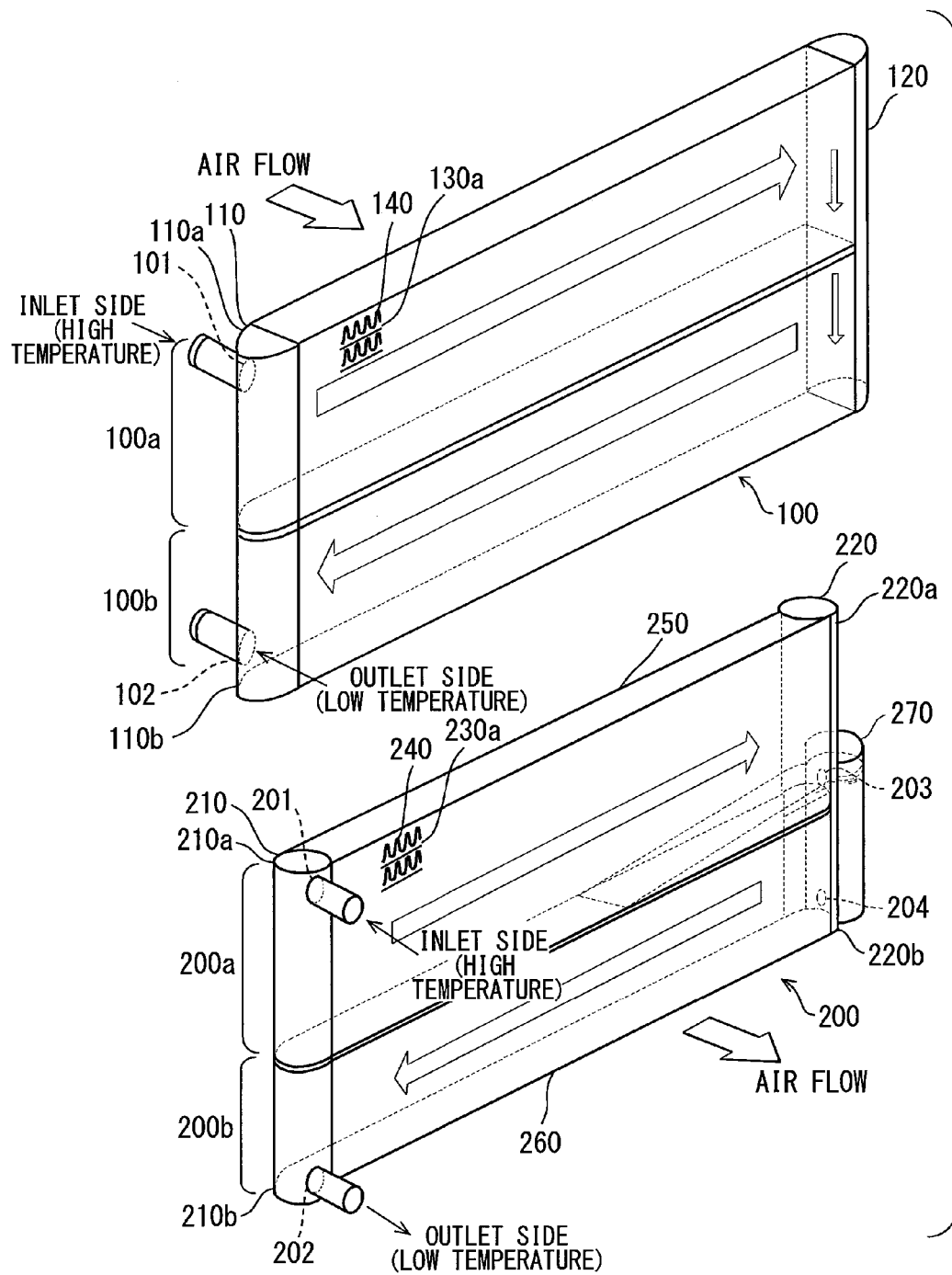
FIG. 4 is a perspective view illustrating a low-temperature side radiator and a condenser according to the first embodiment.

The low-temperature side radiator 100 includes a first tank 110, a second tank 120, a plurality of upper tubes 130a, a plurality of lower tubes 130b, and fins 140, as illustrated in FIGS. 1 and 4. A partition 111 is provided in the first tank 110 to divide the first tank 110 into an upper tank 110a and a lower tank 110b. The upper tank 110a has the inlet port 101 which is in communication with the interior of the upper tank 110a. The lower tank 110b has the outlet port 102 which is in communication with the interior of the lower tank 110b.

A plurality of upper tubes 130a communicate with the upper tank 110a and form the upper path 100a. A plurality of lower tubes 130b communicate with the lower tank 110b and form the lower path 100b. The first tank 110 and the second tank 120 are located on respective ends of the upper tubes 130a and the lower tubes 130b in the longitudinal direction. The first tank 110 and the second tank 120 are in communication with each of the upper tubes 130a and the lower tubes 130b. The fins 140 having a wave shape are provided between adjacent upper tubes 130a in an up-down direction of the accompanying drawing, and thus efficiency of heat exchange between the coolant and the air is increased. Similarly, the fins 140 having a wave shape are also provided between adjacent lower tubes 130b in the up-down direction of the accompanying drawing, and thus efficiency of heat exchange between the coolant and the air is increased.

The temperature of the coolant is increased by the heat exchange with the intercooler 180 and is fed by the low-temperature side pump 190 to flow into the upper tank 110a through the inlet port 101. After entering the upper tank 110a, the coolant is distributed to flow through the plurality of upper tubes 130a constituting the upper path 100a. Next, the coolant flows to the left side of the accompanying drawing. Then, the coolant is subjected to heat exchange with air through the fins 140 and is cooled. After flowing through the upper path 100a, the coolant flows into the second tank 120 and is collected therein. Next, the coolant moves, in the second tank 120, to the lower side of the accompanying drawing. Subsequently, the coolant, which moved in the second tank 120 to the lower side of the accompanying drawing, is distributed to flow through the plurality of lower tubes 130b constituting the lower path 100b. Next, the coolant flows to the right side of the accompanying drawing. The coolant is subjected to heat exchange with air through the fins 140 and is further cooled. After flowing through the lower path 100b, the coolant flows into the lower tank 110b and is collected therein. Subsequently, the coolant is returned to the intercooler 180 through the outlet port 102.

Next, the details of a high-temperature side coolant cycle 30, in which the engine 380, the high-temperature side radiator 300, and the high-temperature side pump 390 are connected to one another through piping to form a circuit, are described with reference to FIG. 1. Fuel-air mixture is burned in the engine 380, and thus heat is generated in the engine 380. The engine 380 is cooled by the coolant. The coolant, which is heated by cooling the engine 380, is supplied to the high-temperature side radiator 300. The high-temperature side radiator 300 performs heat exchange between the coolant and air to cool the coolant. The coolant, which is cooled in the high-temperature side radiator 300, is resupplied to the engine 380 by the high-temperature side pump 390. The coolant circulating in the high-temperature side radiator 300 is, for example, water having an ethylene-glycol-based antifreeze solution mixed therein, similar to the coolant circulating in the low-temperature side radiator 100.

The high-temperature side radiator 300 according to the present embodiment has an I-shaped flow structure. In the I-shaped flow structure, the coolant flows in through an inlet port (an inflow portion) 301 which is located at an upper right position of the accompanying drawing. Then, the coolant flows to the left side in the horizontal direction of the accompanying drawing through a path 300a which is formed in the high-temperature side radiator 300. Subsequently, the coolant flows out through an outlet port (an outlet portion) 302 which is located at a lower left position of the accompanying drawing. In the I-shaped flow structure, coolant moves in one direction. As a result, the I-shaped flow structure has an advantage in that pressure loss is small.

The high-temperature side radiator 300 includes a first tank 310, a second tank 320, a plurality of tubes 330, and fins 340. The first tank 310 has an inlet port 301 which is in communication with the interior of the first tank 310. The second tank 320 has an outlet port 302 which is in communication with the interior of the second tank 320. The first tank 310 and the second tank 320 are disposed on respective ends of the plurality of tubes 330 in the longitudinal direction. The first tank 310 and the second tank 320 communicate with each of the tubes 330. The plurality of tubes 330 form the path 300a. The fins 340 have a wave shape. The fins 340 are provided between adjacent tubes 330 in the up-down direction of the accompanying drawing, and thus efficiency of heat exchange between the coolant and the air is increased.

The coolant which is heated by the engine 380 is supplied, by the high-temperature side pump 390, to the first tank 310 through the inlet port 301. After entering the first tank 310, the coolant is distributed to flow through the plurality of tubes 330 constituting the path 300a. Then, the coolant is subjected to heat exchange with air through the fins 340 and is cooled. After flowing through the path 300a, the coolant flows into the second tank 320 and is collected therein. The coolant which is collected into the second tank 320 is resupplied to the engine 380 through the outlet port 302.

Next, the details of a refrigeration cycle 20, in which an evaporator 280, a compressor 290, a condenser 200, and an expansion valve 281 are connected to one another through piping to form a circuit, will be described with reference to FIG. 1. The evaporator 280 performs heat exchange between refrigerant and air to heat and evaporate the refrigerant. The compressor 290 increases the pressure of the refrigerant supplied by the evaporator 280 and supplies the refrigerant to the condenser 200. The condenser 200 performs heat exchange between the refrigerant and air to cool the refrigerant. The expansion valve 281 performs adiabatic expansion of the refrigerant, which is cooled in the condenser 200, to reduce the pressure of the refrigerant, and then resupplies the refrigerant to the evaporator 280.

The condenser 200 according to the present embodiment has a U-turn cross-flow structure, similar to the low-temperature side radiator 100. In the U-turn cross-flow structure, the refrigerant flows in through an inlet port (an inflow portion) 201 which is located at an upper right position of the accompanying drawing. Then, the refrigerant flows, to the left side in the horizontal direction of the accompanying drawing, in a condenser core 250 which is located, as shown in the accompanying drawing, in an upper portion of the condenser 200. Subsequently, the refrigerant reverses direction on the left side of the accompanying drawing. Then, the refrigerant flows, to the right side in the horizontal direction of the accompanying drawing, in a subcooler 260 which is located, as shown in the accompanying drawing, on the lower side of the condenser 200. Next, the refrigerant flows out through an outlet port (an outlet portion) 202 which is located at a lower right position of the accompanying drawing.

The condenser 200 is a subcooler condenser which is constituted by integrally assembling the first tank 210, the second tank 220, the condenser core 250, the subcooler 260, and the receiver 270, as illustrated in FIGS. 1 and 4. The first tank 210 and the second tank 220 are disposed on respective ends of the condenser core 250 and the subcooler 260 in the longitudinal direction.

A partition 211 is provided in the first tank 210, and thus the first tank 210 is divided into an upper tank 210a and a lower tank 210b. The upper tank 210a has the inlet port 201 which is in communication with the interior of the upper tank 210a. The lower tank 210b has the outlet port 202 which is in communication with the interior of the lower tank 210b. Similarly, a partition 221 is provided in the second tank 220, and thus the second tank 220 is divided into an upper tank 220a and a lower tank 220b.

The condenser core 250 includes a plurality of upper tubes 230a and forms an upper path 200a. The upper tubes 230a are in communication with the upper tank 210a of the first tank 210 and the upper tank 220a of the second tank 220. Fins 240 having a wave shape are provided between adjacent upper tubes 230a in the up-down direction of the accompanying drawing, and thus efficiency of heat exchange between the refrigerant and the air is increased.

The subcooler 260 includes a plurality of lower tubes 230b and forms a lower path 200b. The lower tubes 230b are in communication with the lower tank 210b of the first tank 210 and the lower tank 220b of the second tank 220. Fins 240 having a wave shape are provided between adjacent lower tubes 230b in the up-down direction of the accompanying drawing, and thus efficiency of heat exchange between the refrigerant and the air is increased.

The receiver 270 and the second tank 220 are integrated by, for example, soldering or brazing. The receiver 270 is in communication with the upper tank 220a of the second tank 220 through an upper communication port 203 and the receiver 270 is in communication with the lower tank 220b of the second tank 220 through a lower communication port 204.

In the evaporator 280, the refrigerant is subjected to heat exchange with air and absorbs heat. Further, the pressure of the refrigerant is increased by the compressor 290. Then, the refrigerant is supplied to the upper tank 210a of the first tank 210 through the inlet port 201. After flowing into the upper tank 210a, the refrigerant is distributed to flow through the plurality of upper tubes 230a constituting the upper path 200a. Next, the refrigerant is cooled by being subjected to heat exchange with air through the fins 240 and is condensed. After flowing through the upper path 200a, the refrigerant is supplied to the upper tank 220a of the second tank 220.

A portion of the refrigerant supplied to the upper tank 220a is condensed into a liquid and is collected at the receiver 270 through the upper communication port 203. The liquid-phase refrigerant stored in the receiver 270 is supplied to the lower tank 220b of the second tank 220 through the lower communication port 204. After being supplied to the lower tank 220b, the liquid-phase refrigerant is distributed to flow through a plurality of lower tubes 230b constituting the lower path 200b in the subcooler 260. The liquid-phase refrigerant flowing through the lower path 200b is subjected to heat exchange with air through the fins 240 and is subcooled. After flowing through the lower path 200b, the subcooled liquid-phase refrigerant is collected at the lower tank 210b of the first tank 210. Subsequently, the liquid-phase refrigerant is supplied to the expansion valve 281 and the evaporator 280 through the outlet port 202.

Figure 2:
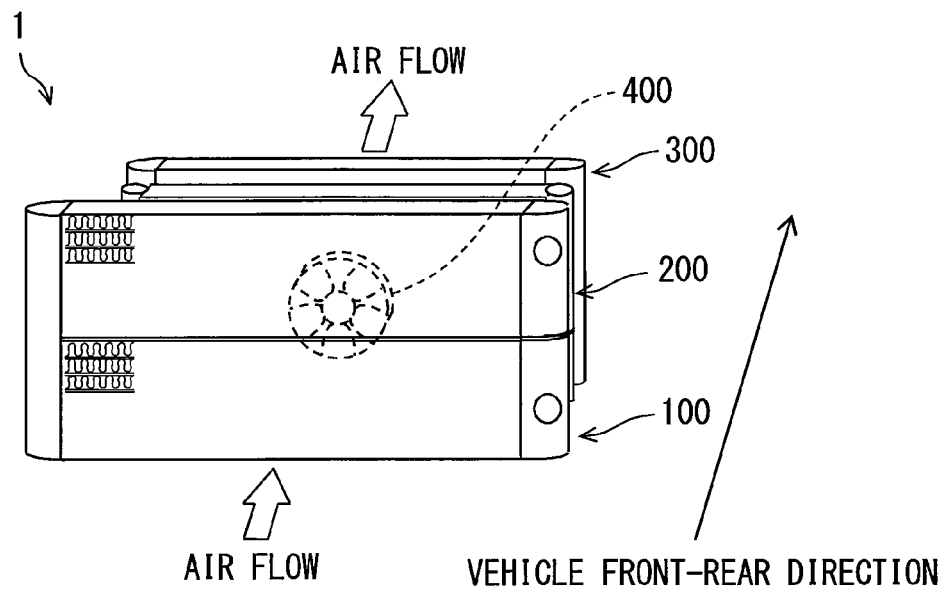
FIG. 2 is a perspective view illustrating a vehicle heat exchanger according to the first embodiment.
Figure 3:
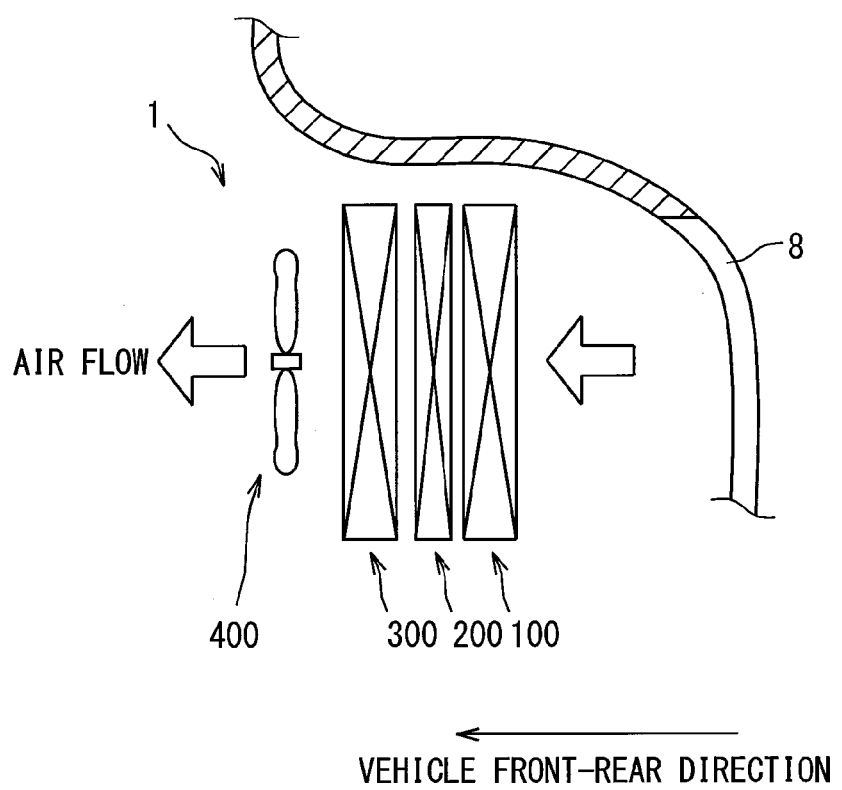
FIG. 3 is a layout view illustrating the vehicle heat exchanger according to the first embodiment.

The low-temperature side radiator 100, the condenser 200, the high-temperature side radiator 300, and the fan 400 of the vehicle heat exchanger 1 are integrated using, for example, a bracket and constitute an ECM, as illustrated in FIGS. 2 and 3. The ECM is mounted on the front portion of a vehicle 8 and is located behind a radiator grille. The low-temperature side radiator 100, the condenser 200, the high-temperature side radiator 300, and the fan 400 according to the present embodiment are aligned in the front-rear direction, in the vehicle 8 and are arranged in this order from the front side to the rear side of the vehicle. In other words, in the vehicle heat exchanger 1 of the present embodiment, the low-temperature side radiator 100, the condenser 200, the high-temperature side radiator 300, and the fan 400 are arranged in this order in an airflow direction such that air which is subjected to heat exchange passes therethrough. The fan 400 is driven by, for example, a motor. The fan 400 generates an air flow directed from the front side to the rear side of the vehicle 8, in relation to the low-temperature side radiator 100, the condenser 200, and the high-temperature side radiator 300.

Next, the configurations of the low-temperature side radiator 100 and the condenser 200 according to the present embodiment will be described with reference to FIG. 4. As described above, the refrigerant flowing in the condenser 200 passes through the upper path 200a, which is disposed in the condenser core 250 and is constituted of the upper tubes 230a. Here, the refrigerant is subjected to heat exchange with air and is cooled. On the downstream side of the refrigerant which is located, as shown in the accompanying drawing, on the right side of the condenser core 250, a part of the refrigerant is condensed and is converted to a liquid-phase refrigerant, as schematically illustrated by the dotted line. The liquid-phase refrigerant is collected at the receiver 270 and passes through the lower path 200b, which is disposed in the subcooler 260 and is formed by the lower tubes 230b. Here, the liquid-phase refrigerant is subjected to heat exchange with air and is subcooled.

In other words, in the condenser core 250, a mostly gas-phase refrigerant is condensed and emits latent heat while being cooled. In contrast, in the subcooler 260, the liquid-phase refrigerant emits sensible heat while being cooled. Accordingly, the heat emission amount from the subcooler 260 is smaller than that of the condenser core 250. Thus, to allow the subcooler 260 to effectively subcool the liquid-phase refrigerant, it is preferable to reduce the influence of heat due to, for example, high-temperature air, as much as possible.

Here, as a comparative reference example, a low-temperature side radiator can be conceived in which a flow path of a coolant is formed to flow from a lower portion to an upper portion of a radiator. That is, the coolant which has not been cooled by the radiator and is in a high-temperature state flows in the horizontal direction in the lower portion of the radiator. In other words, in the low-temperature side radiator of the reference example, air and the coolant in a high-temperature state are subjected to heat exchange in the lower portion of the radiator, and thus the air is heated. The heated air passes through the lower portion of the condenser which is located downstream in the airflow direction. Thus, there is a concern that cooling of the refrigerant in the lower portion of the condenser may be hindered by the heated air. Particularly, when a subcooling condenser is used as in the case of the present embodiment, the thermal influence of the radiator on the subcooler may be significant.

Figure 5:
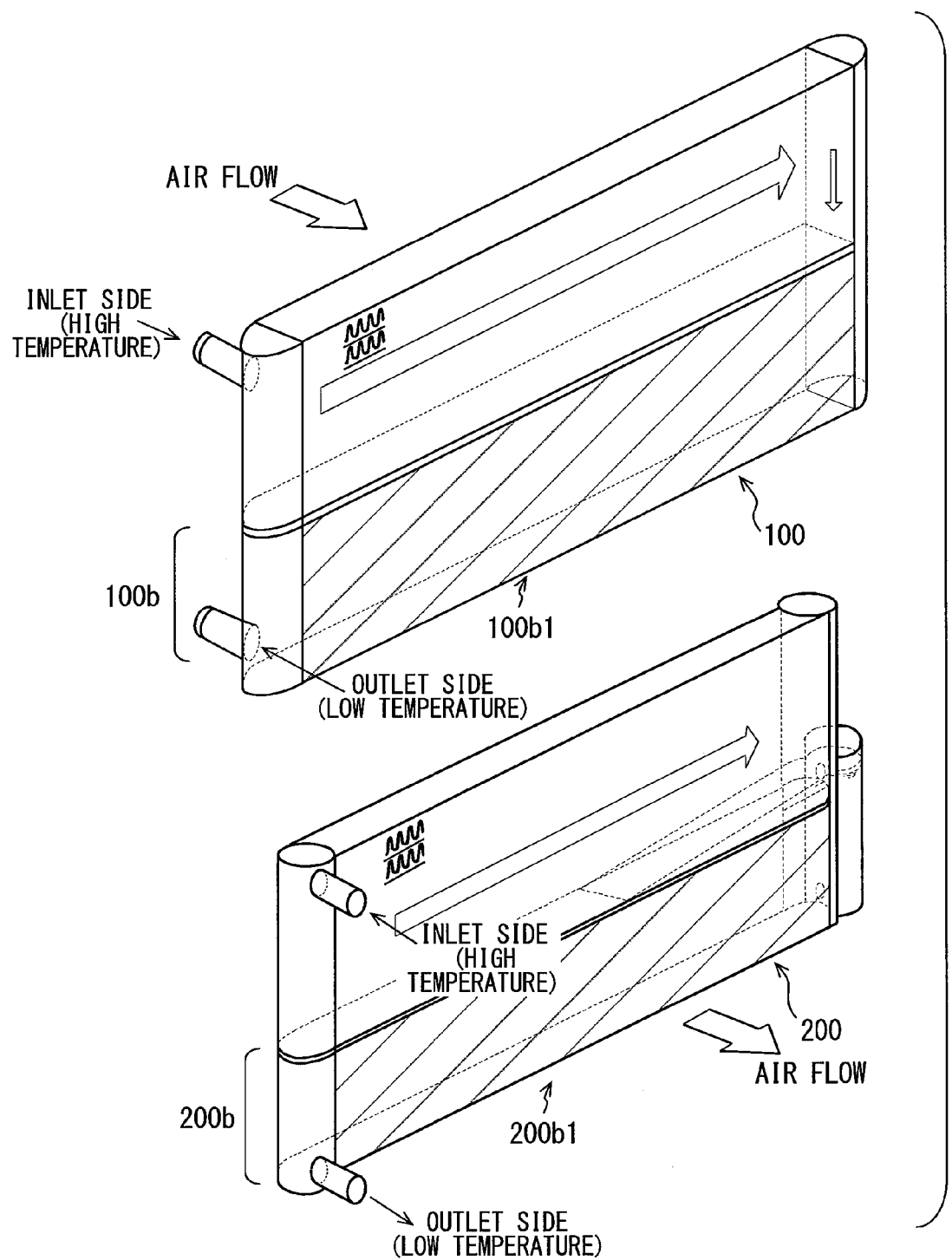
FIG. 5 is a perspective view illustrating a heat exchange surface which is formed by the low-temperature side radiator and the condenser according to the first embodiment.

The arrangement of the low-temperature side radiator 100 and the condenser 200 according to the present embodiment, which is made in consideration of the problem described above, will be described with reference to FIGS. 5 and 6. The lower path 100b of the low-temperature side radiator 100 forms, with respect to the airflow direction, a lower-path heat exchange surface 100b1 which is illustrated by a hatched area, as illustrated in FIG. 5. In addition, the lower path 200b which is provided in the subcooler 260 of the condenser 200 forms, with respect to the airflow direction, a lower-path heat exchange surface 200b1 which is illustrated by a hatched area.

Figure 6:
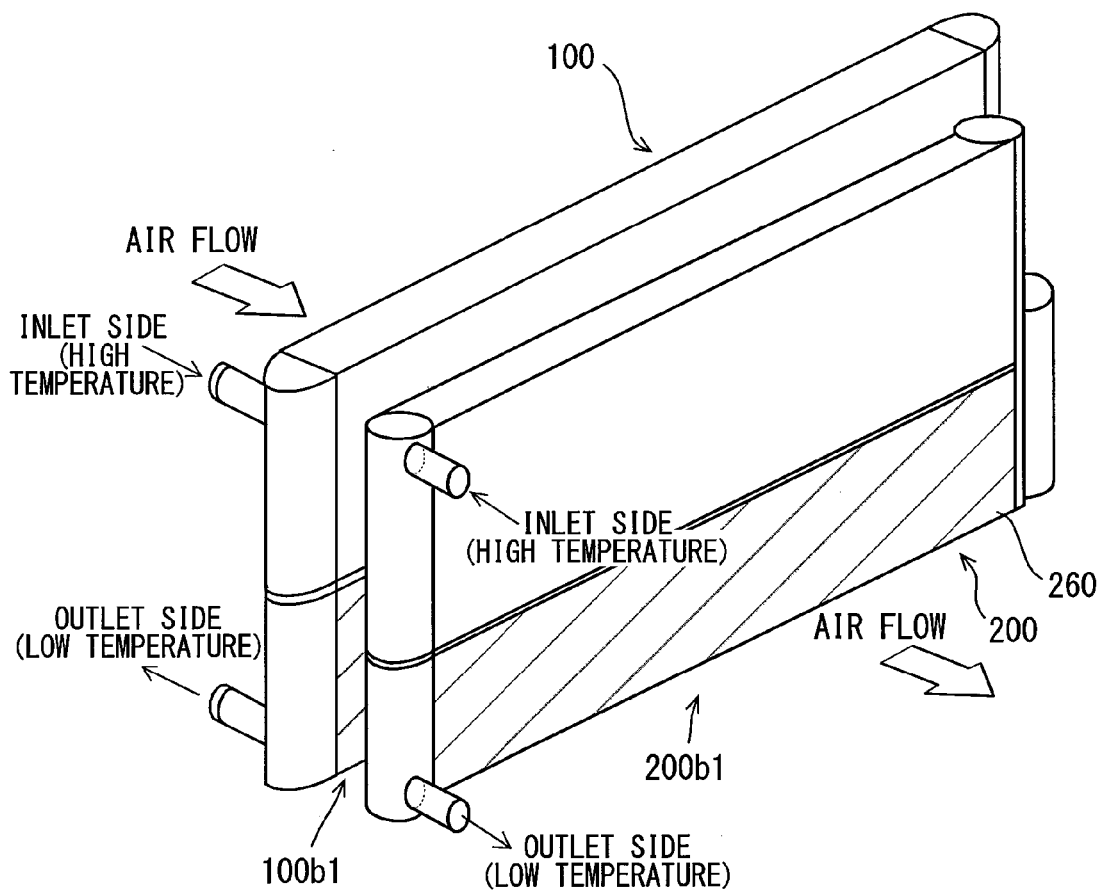
FIG. 6 is a perspective view illustrating a state where the low-temperature side radiator and the condenser according to the first embodiment are assembled.

The low-temperature side radiator 100 and the condenser 200 are aligned in the airflow direction, and thus the low-temperature side radiator 100 faces the condenser 200, as illustrated in FIG. 6. In the state described above, the low-temperature side radiator 100 and the condenser 200 are integrated using, for example, a bracket (not illustrated). In the present embodiment, the lower-path heat exchange surface 200b1 of the condenser 200 overlaps, in the airflow direction, with the lower-path heat exchange surface 100b1 of the low-temperature side radiator 100. In other words, the subcooler 260 of the condenser 200 overlaps, in the airflow direction, with the lower path 100b of the low-temperature side radiator 100. Accordingly, air which passes through the lower path 100b of the low-temperature side radiator 100 passes through the lower path 200b of the condenser 200. In other words, the air passes through the subcooler 260.

More specifically, the entirety of the subcooler 260 according to the present embodiment overlaps, in the airflow direction, with at least a part of the lower path 100b of the low-temperature side radiator 100. In addition, the subcooler 260 of the present embodiment does not overlap, in the airflow direction, with the upper path 100a of the low-temperature side radiator 100.

In the configuration described above, after passing through the upper path 100a of the low-temperature side radiator 100 and cooled, the coolant flows through the lower path 100b. Here, the air, which passed through the lower path 100b and was subjected to heat exchange, then passes through the subcooler 260 of the condenser 200. Accordingly, high temperature air can be prevented from passing through the subcooler 260, and thus the subcooling performance of the subcooler 260 can be maintained.

The coolant passing through the lower path 100b of the low-temperature side radiator 100 flows in the lower left direction as illustrated by the arrows of FIG. 4. Similarly, the refrigerant passing through the lower path 200b of the condenser 200 also flows in the lower left direction as illustrated by the arrows. In other words, when the low-temperature side radiator 100 and the condenser 200 are mounted on a vehicle as shown in FIGS. 2 and 3, the coolant passing through the lower path 100b and the refrigerant passing through the lower path 200b flow in the same direction.

Figure 7:
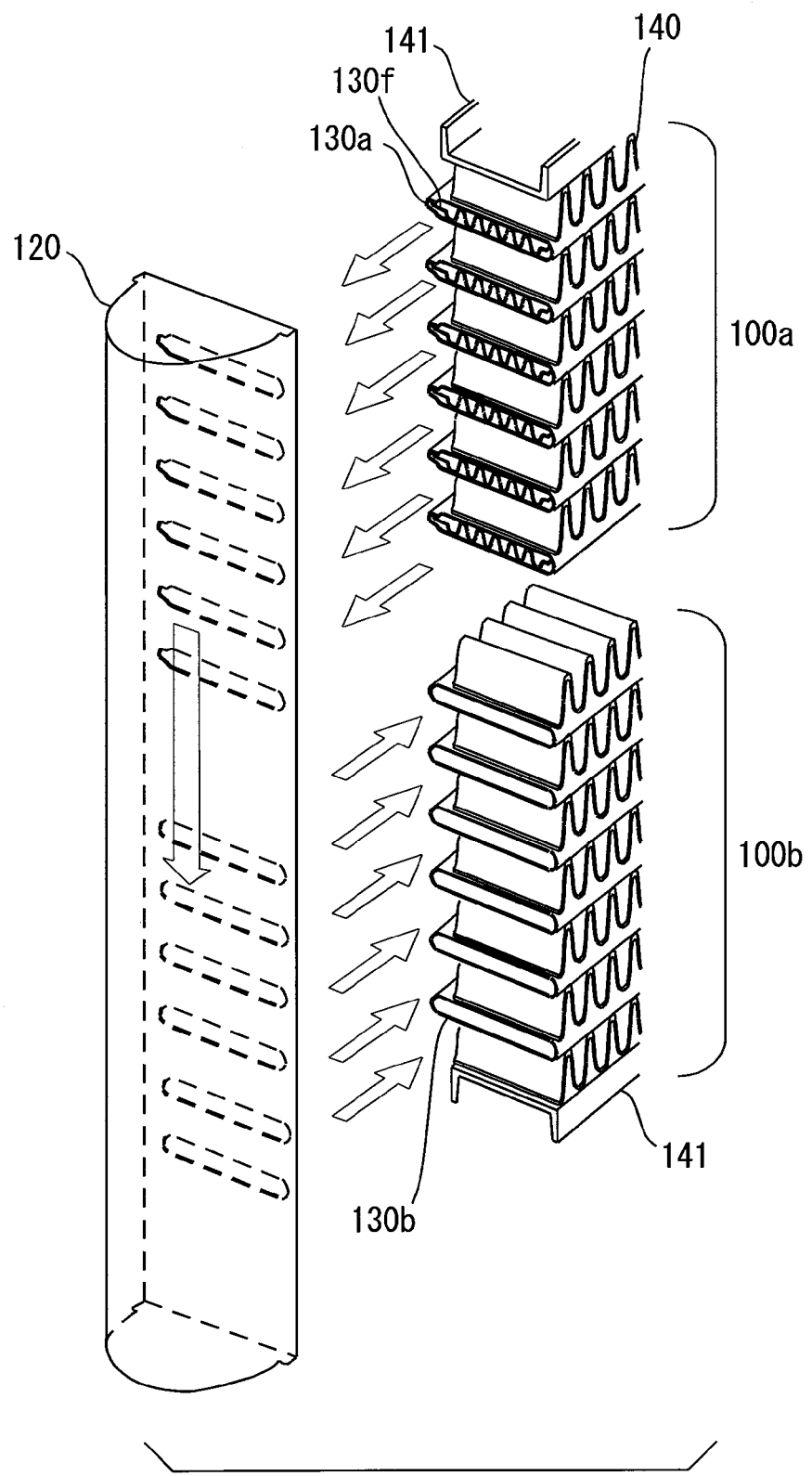
FIG. 7 is a perspective view illustrating upper tubes, a second tank, and lower tubes of the low-temperature side radiator according to the first embodiment.

Next, the details of the upper tubes 130a, the lower tubes 130b, and the second tank 120 of the low-temperature side radiator 100 according to the present embodiment will be described with reference to FIGS. 7 and 8. FIG. 7 illustrates a positional relationship between the upper tubes 130a, the lower tubes 130b, and the second tank 120 in a pre-assembly state. The upper tubes 130a, the lower tubes 130b, and the second tank 120 having such a positional relationship are assembled and communicate with one another. Accordingly, the coolant flows into the second tank 120 through the upper tubes 130a, and then the coolant flows through the lower tubes 130b, as illustrated by the arrows. Inserts 141 are provided, via the fins 140, on both a surface of the upper tubes 130a, which is the uppermost surface in the accompanying drawing, and a surface of the lower tubes 130b, which is the lowermost surface in the accompanying drawing. Thus, the upper tubes 130a and the lower tubes 130b are reinforced by the inserts 141. Members, such as the upper tubes 130a, the lower tubes 130b, and the fins 140, are formed of, for example, an aluminum alloy.

Here, each of the upper tubes 130a according to the present embodiment is an inner-fin tube. Accordingly, inner fins 130f are provided in the upper tubes 130a. The inner fins 130f partition the cross-sectional surface of each upper tubes 130a and extend in a longitudinal direction of the upper tubes 130a. Furthermore, in the upper tubes 130a, the inner fins 130f form a plurality of flow paths. The inner fins 130f increase the contact area in relation to the coolant which flows in the upper tubes 130a, and thus the inner fins 130f increase efficiency of heat exchange in the upper tubes 130a. In contrast, the lower tubes 130b are flat tubes which do not have the inner fins 130f and have a single flow path. The flat tubes do not have a member provided therein, and thus the area of the flow path can be set to be large.

Figure 8:
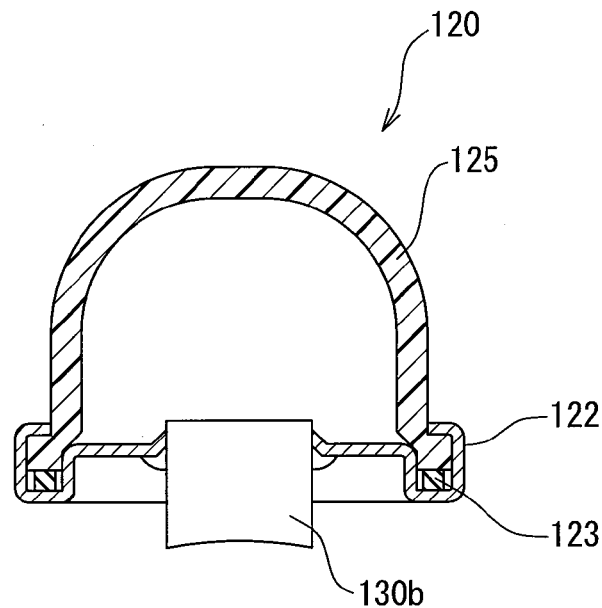
FIG. 8 is a cross-sectional view taken along line VIII-VIII in FIG. 1.

FIG. 8 illustrates a cross-sectional surface of the second tank 120, taken in a direction perpendicular to the longitudinal direction. The second tank 120 according to the present embodiment includes a tank body portion 125, a tank base portion 122, and a gasket 123. The tank body portion 125 is a semicylinder-shaped member formed of, for example, a resin, such as a polyamide. The tank base portion 122 is obtained by performing plastic processing on a plate-shaped member formed of, for example, an aluminum alloy. The gasket 123 is formed of a soft resin, such as EPDM. The gasket 123 is provided in a joint portion between the tank body portion 125 and the tank base portion 122 and prevents leakage of coolant.

Generally, the temperature of the coolant which flows in the second tank 120 of the low-temperature side radiator 100 is lower than that of the coolant which flows in the high-temperature side radiator 300. Accordingly, the second tank 120 can be mainly formed of a resin, and thus the cost and the weight thereof are low. Furthermore, the first tank 110 and the second tank 120 have the same configuration. The first tank 110 includes the partition 111, the inlet port 101, and the outlet port 102.

Next, the operational effect of the vehicle heat exchanger 1 according to the present embodiment will be described. The vehicle heat exchanger 1 according to the present embodiment includes the low-temperature side radiator 100 which performs heat exchange between coolant and air to cool the coolant. The vehicle heat exchanger 1 also includes the condenser 200 which performs heat exchange between the refrigerant of the refrigeration cycle 20 and air to cool the refrigerant. The vehicle heat exchanger 1 further includes the high-temperature side radiator 300 which performs heat exchange between the coolant of which the temperature is high due to the low-temperature side radiator 100 and air to cool the coolant.

Here, the low-temperature side radiator 100, the condenser 200, and the high-temperature side radiator 300 are aligned in the airflow direction, in other words, the front-rear direction of a vehicle, and are integrated together. Accordingly, upon comparison with a configuration in which two or more heat exchangers of the heat exchangers described above are aligned in the up-down direction or the left-right direction, the size of the vehicle heat exchanger can be reduced in the up-down direction or the left-right direction of a vehicle, and thus mounting properties when mounting to a vehicle are improved. Furthermore, the heat exchangers can be set to have large areas in the airflow direction, and as a result, the heat exchanging performance may be increased.

However, if the heat exchangers are aligned as described above, there is a concern that air heated by the low-temperature side radiator 100 located at an upstream position in the airflow direction may thermally influence the condenser 200 and, particularly, the subcooler 260. Therefore, the low-temperature side radiator 100 of the present embodiment includes the inlet port 101 which is located in the upper portion of the low-temperature side radiator 100, and includes the upper path 100a which is in communication with the inlet port 101 and extends in the horizontal direction. Furthermore, the low-temperature side radiator 100 includes the lower path 100b which is located below the upper path 100a, is in communication with the upper path 100a, and extends in the horizontal direction, and includes the outlet port 102 which is located below the low-temperature side radiator 100 and is in communication with the lower path 100b.

Accordingly, in the low-temperature side radiator 100, a flow path is provided in which the coolant flows from the inlet port 101 and the upper path 100a which are located in the upper portion of the low-temperature side radiator 100 to the lower path 100b and the outlet port 102 which are located in the lower portion of the low-temperature side radiator 100.

The condenser 200 includes the condenser core 250 and the subcooler 260. The subcooler 260 is located below the condenser core 250 and subcools the liquid-phase refrigerant supplied from the condenser core 250. Furthermore, the subcooler 260 of the condenser 200 overlaps, in the airflow direction, with the lower path 100b of the low-temperature side radiator 100.

In the configuration described above, the coolant, having passed through the upper path 100a of the low-temperature side radiator 100 to be cooled, flows through the lower path 100b. Air, which passed through the lower path 100b and was subjected to heat exchange, flows through the subcooler 260 of the condenser 200. Accordingly, air heated by high-temperature coolant which has not been cooled by the low-temperature side radiator 100 can be prevented from passing through the subcooler 260. As a result, the subcooling performance of the subcooler 260 can be maintained.

Furthermore, the inlet port 101 is disposed in the upper portion of the low-temperature side radiator 100 and the outlet port 102 is disposed in the lower portion thereof, in such a manner that a flow path of the coolant is from the upper side to the lower side. Thus, in a structure in which a plurality of heat exchangers are aligned, the condenser 200 including the subcooler 260 can be disposed downstream from the low-temperature side radiator 100.

In the present embodiment, the low-temperature side radiator 100, the condenser 200, and the high-temperature side radiator 300 are arranged in this order in the airflow direction. In such a configuration, the low-temperature side radiator 100 is located in the frontmost row of the vehicle heat exchanger 1 in the front-rear direction of the vehicle, and thus the low-temperature side radiator 100 may be configured to have a large ventilation area with respect to air. Accordingly, fresh air entering the vehicle 8 can be preferentially supplied to the low-temperature side radiator 100, and thus the coolant passing through the low-temperature side radiator 100 can be effectively cooled. Particularly, in the case of the arrangement described above, the upper path 100a of the low-temperature side radiator 100 can be configured to have a large heat exchange area. Accordingly, the coolant can be sufficiently cooled in the upper path 100a and the cooled coolant can be supplied to the lower path 100b. Thus, thermal influence on the subcooler 260 of the condenser 200 by the coolant flowing through the lower path 100b can be further reduced.

The high-temperature side radiator 300 is located on the most downstream side in the airflow direction with respect to the low-temperature side radiator 100 and the condenser 200. Accordingly, high-temperature air passing through the high-temperature side radiator 300 can be prevented from passing through the low-temperature side radiator 100 and the condenser 200. Thus, thermal influence of the high-temperature side radiator 300 on the low-temperature side radiator 100 and the condenser 200 can be reduced.

In the present embodiment, the upper path 100a of the low-temperature side radiator 100 includes a plurality of upper tubes 130a. Each of the plurality of the upper tubes 130a includes the inner fins 130f which partitions the interior of the upper tubes 130a and extends in the longitudinal direction of the upper tubes 130a. The lower path 100b of the low-temperature side radiator 100 includes a plurality of lower tubes 130b. Each of the plurality of lower tubes 130b has a single coolant flow channel. In other words, the lower tubes 130b do not include a member similar to the inner fins 130f.

The inner fins 130f increase the contact area in relation to air, and thus efficiency of heat exchange between the coolant flowing through the upper tubes 130a and air is increased. Accordingly, when coolant passes through the upper path 100a having the upper tubes 130a, the coolant is effectively cooled. Accordingly, coolant is effectively cooled before the coolant flows into the lower tubes 130b through the second tank 120. Thus, thermal influence on the subcooler 260 by the coolant flowing through the lower tubes 130b can be effectively avoided. In the present embodiment, the inner fins 130f function as a heat-exchange efficiency improvement member for improving the efficiency of heat exchange with air.

In contrast, the lower tubes 130b are flat tubes which do not have the inner fins 130f and have a single flow path. The flat tubes do not have a member provided therein, and thus the area of a flow path can be set to be large. Accordingly, pressure loss of coolant flowing through the lower tubes 130b is reduced, and thus the coolant is rapidly discharged from the condenser 200. Thus, thermal influence on the subcooler 260 by the coolant flowing through the lower tubes 130b can be further reduced.

In the present embodiment, the subcooler 260 forms a refrigerant flow channel. In addition, the flowing direction of the coolant flowing through the coolant flow channel of the lower path 100b and the flowing direction of the refrigerant flowing through the refrigerant flow channel of the subcooler 260 are the same. In the configuration described above, the upstream side and the downstream side of the lower path 100b correspond to the upstream side and the downstream side of the subcooler 260, respectively. In other words, the coolant which is in the most cooled state in the most downstream side of the lower path 100b is located upstream, in airflow direction, with respect to the refrigerant which is in the most cooled state in the most downstream side of the subcooler 260. Thus, high-temperature coolant, which has not been cooled by the lower path 100b, can be prevented from flowing in a vicinity of the most downstream side of the subcooler 260. Accordingly, thermal influence by the low-temperature side radiator 100 on the most downstream side of the subcooler 260 can be further reduced.

In the present embodiment, the low-temperature side radiator 100 is included in the low-temperature side coolant cycle 10 in which coolant for cooling a first heat generation unit circulates. The high-temperature side radiator 300 is included in the high-temperature side cooling-water cycle 30 in which coolant for cooling a second heat generation unit circulates. The coolant circuit formed by the low-temperature side coolant cycle 10 and the coolant circuit formed by the high-temperature side coolant cycle 30 are independent of each other. In the present embodiment, the intercooler 180 is an example of the first heat generation unit and the engine 380 is an example of the second heat generation unit.

The high-temperature side coolant cycle 30 cools the coolant which passes through the engine 380, as described above. Thus, the temperature of the coolant flowing in the high-temperature side coolant cycle 30 is higher than that of the coolant flowing in the low-temperature side coolant cycle 10. In the configuration of the present embodiment, the coolant circulating in the low-temperature side coolant cycle 10 and the coolant circulating in the high-temperature side coolant cycle 30 are not subjected to joining or branching-off, and thus are prevented from being mixed. In other words, the high-temperature coolant which circulates in the high-temperature side coolant cycle 30 does not flow into the low-temperature side coolant cycle 10. Accordingly, the temperature of the coolant flowing through the low-temperature side radiator 100 of the low-temperature side coolant cycle 10 can be kept low. As a result, thermal influence by the low-temperature side radiator 100 on the condenser 200 can be suppressed.

In the present embodiment, the subcooler 260 and the upper path 100a do not overlap in the airflow direction. As a result, thermal influence on the subcooler 260 by the high-temperature coolant which flows through the upper path 100a can be reduced.

In the present embodiment, the entirety of the subcooler 260 overlaps with at least a part of the lower path 100b in the airflow direction. In the above described configuration in which the flow path of the low temperature side radiator 100 is from the upper side to the lower side, the entirety of the subcooler 260 also overlaps with the lower path 100b. In this case, when compared to a configuration in which a flow path of a low temperature side radiator is from a lower side to an upper side and the entirety of a subcooler overlaps with a lower path, reduction in thermal influence on the subcooler 260 may be significant.

In the present embodiment, an example in which the entirety of the subcooler 260 of the condenser 200 overlaps, in the airflow direction, with the lower path 100b of the low-temperature side radiator 100 airflow direction is described. However, the configuration is not limited thereto. It may be configured so that a part of the subcooler 260 overlaps with at least a part of the lower path 100b of the low-temperature side radiator 100 in the airflow direction. Even in the configuration described above, thermal influence on the subcooler 260 can be reduced.

The configuration described above can be realized in such a way that, for example, the upper end of the subcooler 260 is located below the upper end of the lower path 100b of the low-temperature side radiator 100. Alternatively, the configuration described above can be realized in such a way that the lower end of the subcooler 260 is located above the lower end of the lower path 100b of the low-temperature side radiator 100. Furthermore, the configuration can be realized in such a way that, for example, one end of the subcooler 260 in a first direction length-wise is located further in a second direction opposite the first direction than one end, in the first direction length-wise, of the lower path 100b of the low-temperature side radiator 100. Alternatively, the configuration can be realized in such a way that the other length-wise end of the subcooler 260 is located further in the first direction than the other length-wise end of the lower path 100b of the low-temperature side radiator 100. Furthermore, the entirety of the subcooler 260 and the entirety of the lower path 100b of the low-temperature side radiator 100 may have substantially the same shape and positional relationship in the airflow direction.

Modification Example of First Embodiment

Figure 9:
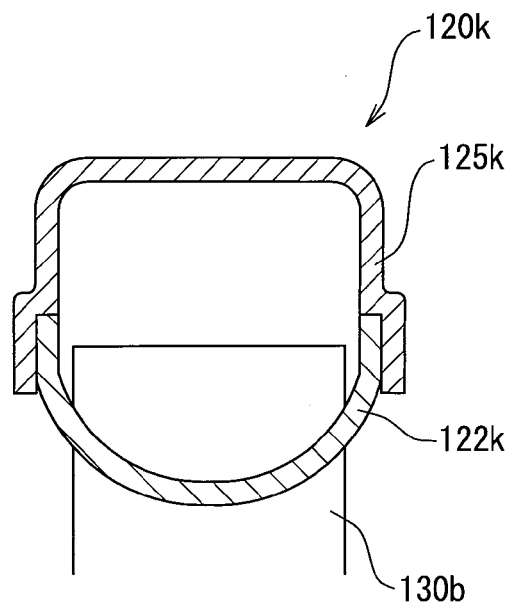
FIG. 9 is a cross-sectional view illustrating a transverse cross-sectional surface of the second tank of the low-temperature side radiator according to a modification example of the first embodiment.

FIG. 9 illustrates a cross-sectional surface of a second tank 120k according to a modification example of the first embodiment. The second tank 120k includes a tank body portion 125k and a tank base portion 122k. The tank body portion 125k is a half-rectangular-tube-shaped member formed of, for example, an aluminum alloy. The tank base portion 122k is a semicylinder-shaped member formed of, for example, an aluminum alloy. The tank base portion 122k is joined to the tank body portion 125k by, for example, soldering or brazing. The second tank 120k according to the modification example can have a robust structure having high heat-resisting properties, compared to the second tank 120 according to the first embodiment, which is formed of a resin.

Second Embodiment

Next, a second embodiment will be described. The same reference numerals and letters are given to members of which the configurations are the same as those of the first embodiment described above. The detailed descriptions thereof will be omitted for brevity.

Figure 10:
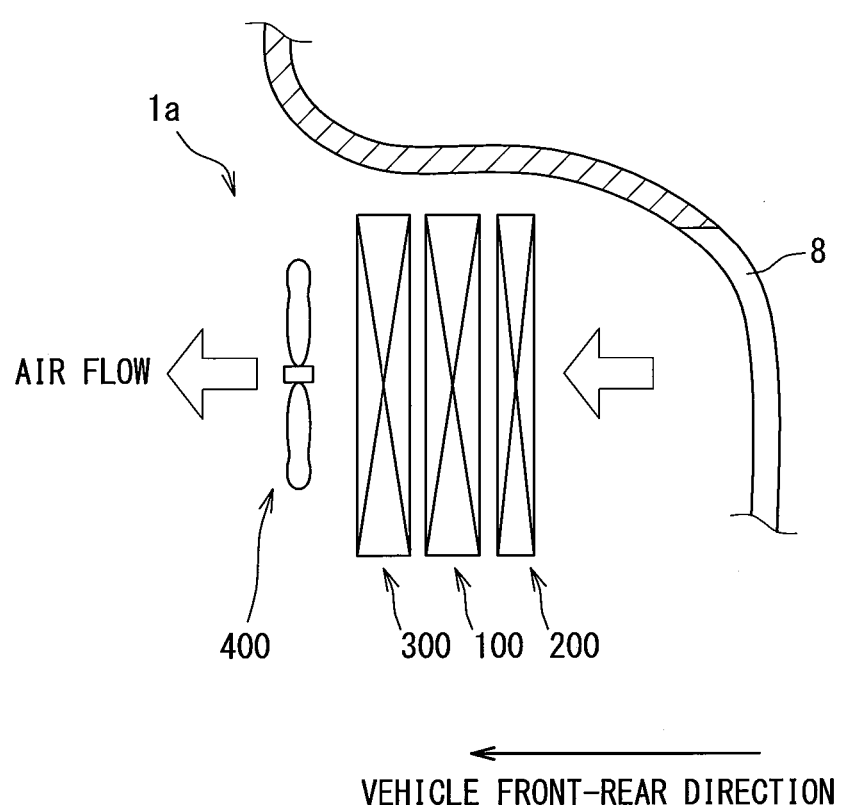
FIG. 10 is a layout view illustrating a vehicle heat exchanger according to a second embodiment applied to the present disclosure.

In a vehicle heat exchanger 1a illustrated in FIG. 10, the condenser 200, the low-temperature side radiator 100, and the high-temperature side radiator 300 are aligned in this order in the airflow direction. In such a configuration, the condenser 200 is located in the frontmost row of the vehicle heat exchanger 1 in the front-rear direction of the vehicle. Thus, the condenser 200 can be allowed to have a large heat exchange area with respect to the air. Accordingly, fresh air entering the vehicle 8 can be preferentially supplied to the condenser 200, and thus the refrigerant of the condenser 200 can be cooled by being effectively subjected to heat exchange.

After being condensed by the compressor 290, the high-pressure refrigerant is supplied to the condenser 200, as described above. Thus, generally, the condenser 200 has a robust configuration having high rigidity when compared to the low-temperature side radiator 100. The robust condenser 200 is located on the frontmost row in the front-rear direction of the vehicle to protect the low-temperature side radiator 100 which is downstream in the airflow direction. Thus, foreign substances in the fresh air can be prevented from directly colliding with the low-temperature side radiator 100.

In the present embodiment, the low-temperature side radiator 100 is located, in the airflow direction, downstream from the condenser 200. Even in such a configuration, it is conceived that radiant heat is generated by the lower path 100b of the low-temperature side radiator 100 and transferred to the subcooler 260. However, in the present embodiment, similarly to in the case of the first embodiment, the coolant flow channel of the low-temperature side radiator 100 extends from the upper side to the lower side, so that the coolant is cooled by passing through the upper path 100a before being supplied to the lower path 100b. Accordingly, influence on the subcooler 260 by the radiant heat generated by the lower path 100b of the low-temperature side radiator 100 can be reduced.

Furthermore, similarly to the case of the first embodiment, the high-temperature side radiator 300 is located, in the airflow direction, downstream of the low-temperature side radiator 100 and the condenser 200. Accordingly, the air which has been heated by the high-temperature side radiator 300 does not pass through the low-temperature side radiator 100 and the condenser 200. Thus, thermal influence by the high-temperature side radiator 300 on the low-temperature side radiator 100 and the condenser 200 can be reduced.

As described in the first embodiment and the present embodiment, the low-temperature side radiator 100 and the condenser 200 may have any front-rear positional relationship as long as the high-temperature side radiator 300 is located, in the airflow direction, on the most downstream side relative to the low-temperature side radiator 100 and the condenser 200. The front-rear positional relationship of the low-temperature side radiator 100 and the condenser 200 can be set based on, for example, a priority level between the low-temperature side radiator 100 and the condenser 200, or convenience with respect to the layout of connection pipes in the vehicle heat exchanger 1. Thus, in the vehicle heat exchanger 1 according to the first embodiment and the present embodiment, a high degree of freedom in design can be maintained while reducing thermal influence by the low-temperature side radiator 100 on the condenser 200.

Third Embodiment

Next, a third embodiment will be described. The same reference numerals and letters are given to members of which the configurations are the same as those of the embodiment described above. The detailed descriptions thereof are omitted for brevity.

Figure 11:
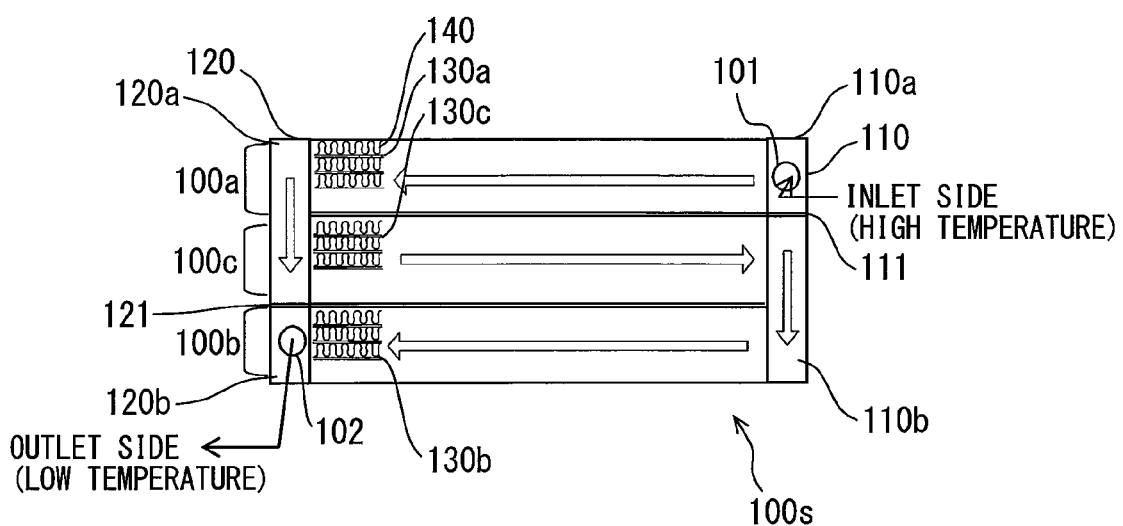
FIG. 11 is a perspective view illustrating a vehicle heat exchanger according to a third embodiment applied to the present disclosure.

A low-temperature side radiator 100s according to the present embodiment illustrated in FIG. 11 includes a plurality of middle-stage tubes 130c, in addition to the upper tubes 130a and the lower tubes 130b. A partition 121 is provided in the second tank 120, and thus the second tank 120 is divided into an upper tank 120a and a lower tank 120b. The upper tank 110a of the first tank 110 has the inlet port 101 which is in communication with the interior of the upper tank 110a. The lower tank 120b of the second tank 120 has the outlet port 102 which is in communication with the interior of the lower tank 120b. The plurality of middle-stage tubes 130c communicate with the lower tank 110b of the first tank 110 and the upper tank 120a of the second tank 120 and form a middle-stage path 100c.

The low-temperature side radiator 100s according to the present embodiment has an S-turn cross-flow structure in which a flow path of the coolant reverses direction twice. In the S-turn cross-flow structure, the coolant flows in through the inlet port 101 which is located on the upper right side of the accompanying drawing and flows through the upper path 100a to the horizontally left side of the accompanying drawing. Then, the flow of the coolant reverses direction. Subsequently, the coolant flows through the middle-stage path 100c, to the horizontally right side of the accompanying drawing, and then the flow of the coolant reverses direction. Next, the coolant flows through the lower path 100b, to the horizontally left side of the accompanying drawing, and then flows out through the outlet port 102 which is located on the lower left side of the accompanying drawing. In addition, the low-temperature side radiator 100s illustrated in the present embodiment can be applied as the low-temperature side radiator 100 described in the first embodiment and the second embodiment.

The low-temperature side radiator 100s according to the present embodiment further includes the middle-stage path 100c which is located between the upper path 100a and the lower path 100b, as described above. The low-temperature side radiator 100s forms a flow path in which the coolant flows through the inlet port 101, the upper path 100a, the middle-stage path 100c, the lower path 100b, and the outlet port 102, in this order. In such an S-turn cross-flow structure, a path through which the coolant flows in the low-temperature side radiator 100s can be configured to have a long length compared to the U-turn cross-flow structure described above. As a result, heat exchange between the coolant and the air is effectively performed.

Fourth Embodiment

Next, a fourth embodiment will be described. The same reference numerals and letters are given to members of which the configurations are the same as those of the embodiment described above. The detailed descriptions thereof are omitted for brevity.

Figure 12:
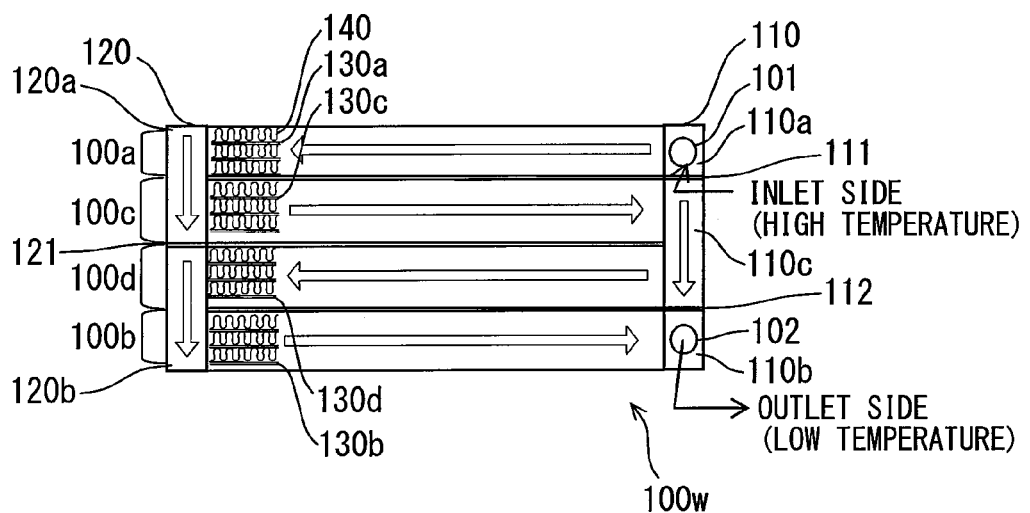
FIG. 12 is a perspective view illustrating a vehicle heat exchanger according to a fourth embodiment applied to the present disclosure.

A low-temperature side radiator 100w illustrated in FIG. 12 includes a plurality of middle-lower stage tubes 130d, in addition to the upper tubes 130a, the lower tubes 130b, and the middle-stage tubes 130c. A partition 112 is additionally provided in the first tank 110, and thus the first tank 110 is divided into the upper tank 110a, a middle-stage tank 110c, and the lower tank 110b. The lower tank 110b of the first tank 110 has an outlet port 102 which is in communication with the interior of the lower tank 110b. The plurality of middle-lower stage tubes 130d communicate with the middle-stage tank 110c of the first tank 110 and the lower tank 120b of the second tank 120 and form a middle-lower stage path 100d.

The low-temperature side radiator 100w according to the present embodiment has a W-turn cross-flow structure in which a flow path of the coolant reverses direction three times. In the W-turn cross-flow structure, the coolant flows in through the inlet port 101 which is located on the upper right side of the accompanying drawing and flows through the upper path 100a, to the horizontally left side of the accompanying drawing. Then, the flow of the coolant reverses direction. Subsequently, the coolant flows through the middle-stage path 100c, to the horizontally right side of the accompanying drawing, and then the flow of the coolant reverses direction. Next, the coolant flows through the middle-lower stage path 100d, to the horizontally left side of the accompanying drawing, and then the flow of the coolant reverses direction. Next, the coolant flows through the lower path 100b, to the horizontally right side of the accompanying drawing, and then flows out through the outlet port 102 which is located on the lower left side of the accompanying drawing.

The low-temperature side radiator 100w according to the present embodiment further includes the middle-stage path 100c as well as the middle-lower stage path 100d, which are located between the upper path 100a and the lower path 100b, as described above. The middle-lower stage path 100d is located below the middle-stage path 100c, and thus a flow path in which the coolant flows through the inlet port 101, the upper path 100a, the middle-stage path 100c, the middle-lower stage path 100d, the lower path 100b, and the outlet port 102, in this order, is formed. In such a W-turn cross-flow structure, a path through which the coolant flows in the low-temperature side radiator 100w can be configured to have a long length compared to the S-turn cross-flow structure described above. As a result, heat exchange between the coolant and the air is effectively performed. The low-temperature side radiator 100w described in the present embodiment can be applied as the low-temperature side radiator 100 described in the first embodiment and the second embodiment.

Fifth Embodiment

In a fifth embodiment, a vehicle heat exchanger 1b, which is another example of the vehicle heat exchanger 1 of the first embodiment, will be described with reference to FIG. 13. Configurations and operations which are described in the first embodiment to the fourth embodiment and the other embodiments described below can be applied to the vehicle heat exchanger 1b.

Figure 13:
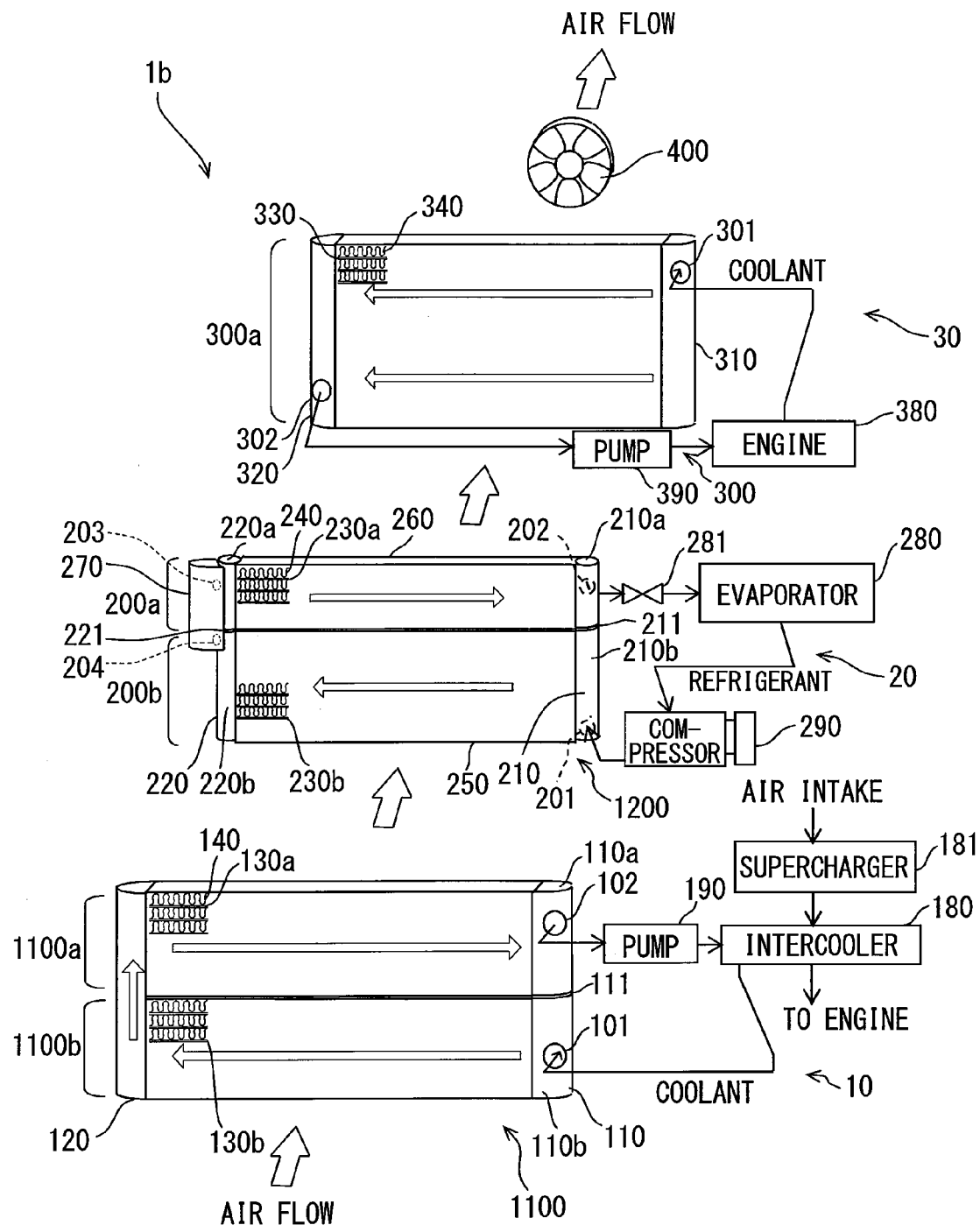
FIG. 13 is a perspective view illustrating a low-temperature side coolant cycle, a refrigeration cycle, and a high-temperature side coolant cycle according to a fifth embodiment applied to the present disclosure.

In FIG. 13, the same reference numerals and letters are given to members of which the configurations are the same as those of the first embodiment, and these members have the same operations and effects as those of the first embodiment. The configurations, the operations, and the effects which are not explained in the fifth embodiment are the same as those of the first embodiment. Hereinafter, only a difference between the present embodiment and the first embodiment will be described.

The vehicle heat exchanger 1b includes a low-temperature side radiator 1100, a condenser 1200, the high-temperature side radiator 300, and the fan 400, as illustrated in FIG. 13. The condenser 1200 is configured so that the subcooler 260 is disposed in the upper portion and the condenser core 250 is disposed in the lower portion. Accordingly, in the condenser 1200, the refrigerant flows from the lower portion to the upper portion. In the low-temperature side radiator 1100, the coolant flows from a lower path 1100b of the lower portion to an upper path 1100a of the upper portion, in accordance with the refrigerant flow.

The low-temperature side radiator 1100 has a U-turn cross-flow structure in which a flow path of the coolant reverses direction. In the low-temperature side radiator 1100, the coolant flows in through the inlet port (an inflow portion) 101 which is located on the lower right side of the accompanying drawing. The coolant flows, to the horizontally left side of the accompanying drawing, through the lower path (an upstream path) 1100b which is formed in the lower portion of the accompanying drawing. Then, the flow of the coolant reverses direction on the left side of the accompanying drawing. Next, the coolant flows, to the horizontally right side of the accompanying drawing, through the upper path (the downstream path) 1100a which is formed in the upper portion of the accompanying drawing, and then the coolant flows out through the outlet port (the outlet portion) 102 which is located on the upper right side of the accompanying drawing. Furthermore, in the present embodiment, the lower path 1100b is an upstream path which the coolant flow into after entering through the inlet port 101. The upper path 1100a is disposed downstream of the lower path 1100b and forms a downstream path through which the coolant passes after passing through the lower path 1100b.

The low-temperature side radiator 1100 includes the first tank 110, the second tank 120, the plurality of upper tubes 130a forming the upper path 1100a, the plurality of lower tubes 130b forming the lower path 1100b, and the fins 140, as illustrated in FIG. 13. The lower tank 110b has the inlet port 101 which is in communication with the interior of the lower tank 110b. The upper tank 110a has the outlet port 102 which is in communication with the interior of the upper tank 110a.

The temperature of the coolant is increased by heat exchange with the intercooler 180 and is fed by the low-temperature side pump 190 to flow into the lower tank 110b through the inlet port 101. After flowing into lower tank 110b, the coolant is distributed to flow through a plurality of lower tubes 130b constituting the lower path 1100b. Next, the coolant flows to the left side of the accompanying drawing. Then, the coolant is subjected to heat exchange with air through the fins 140 and is cooled. After flowing through the lower path 1100b, the coolant flows into the second tank 120 and is collected therein. Next, the coolant moves, in the second tank 120, to the upper side of the accompanying drawing. Subsequently, the coolant, having moved to the upper side of the accompanying drawing in the second tank 120, is distributed to flow through the plurality of upper tubes 130a constituting the upper path 1100a. Then, the coolant flows to the right side of the accompanying drawing. Next, the coolant is subjected to heat exchange with air through the fins 140 and is further cooled. After flowing through the upper path 1100a, the coolant flows into the upper tank 110a and is collected therein. Then, the coolant returns to the intercooler 180 through the outlet port 102.

The condenser 1200 has a U-turn cross-flow structure, similar to the low-temperature side radiator 100. In the U-turn cross-flow structure, the refrigerant flows in through the inlet port (an inflow portion) 201 which is located on the lower right side of the accompanying drawing. Then, the coolant flows, to the horizontally left side of the accompanying drawing, in the condenser core 250 which is located in the lower portion of the condenser 1200 of the accompanying drawing. Subsequently, the flow of the refrigerant reverses direction on the left side of the accompanying drawing, and then the refrigerant flows, to the horizontally right side of the accompanying drawing, in the subcooler 260 which is located on the upper side of the condenser 1200 of the accompanying drawing. Next, the refrigerant flows out through the outlet port (an outlet portion) 202 which is located on the upper right side of the accompanying drawing.

The condenser 1200 is a subcooler condenser which is constituted by integrally assembling the first tank 210, the second tank 220, the condenser core 250, the subcooler 260, and the receiver 270, as illustrated in FIG. 13. The lower tank 210b has the inlet port 201 which is in communication with the interior of the lower tank 210b. The upper tank 210a has the outlet port 202 which is in communication with the interior of the upper tank 210a.

The condenser core 250 includes a plurality of lower tubes 230b and forms the lower path 200b. The subcooler 260 includes a plurality of upper tubes 230a and forms the upper path 200a.

The receiver 270 is integrated in the upper portion of the second tank 220, by, for example, soldering or brazing. The receiver 270 is in communication with the upper tank 220a of the second tank 220 through an upper communication port 203, and the receiver 270 is in communication with the lower tank 220b of the second tank 220 through a lower communication port 204.

In the evaporator 280, the refrigerant is subjected to heat exchange with air and absorbs heat. Next, the pressure of the refrigerant is increased by the compressor 290, and then the refrigerant is supplied to the lower tank 210b of the first tank 210 through the inlet port 201. After entering the lower tank 210b, the refrigerant is distributed to flow through the plurality of lower tubes 230b constituting the lower path 200b. Next, the refrigerant is cooled by being subjected to heat exchange with air through the fins 240 and is condensed. After flowing through the lower path 200b, the refrigerant is supplied to the lower tank 220b of the second tank 220.

A portion of the refrigerant supplied to the lower tank 220b is condensed into a liquid is collected at the receiver 270 through the lower communication port 204. The liquid-phase refrigerant collected in the receiver 270 is supplied to the upper tank 220a of the second tank 220 through the upper communication port 203. After being supplied to the upper tank 220a, the liquid-phase refrigerant is distributed to flow through the plurality of upper tubes 230a constituting the upper path 200a in the subcooler 260. The liquid-phase refrigerant flowing through the upper path 200a is subjected to heat exchange with air through the fins 240 and is subcooled. After flowing through the upper path 200a, the liquid-phase refrigerant is subjected to subcooling is collected at the upper tank 210a of the first tank 210. Subsequently, the liquid-phase refrigerant is supplied to the expansion valve 281 and the evaporator 280 through the outlet port 202.

In the vehicle heat exchanger 1b according to the present embodiment, the low-temperature side radiator 1100, the condenser 1200, the high-temperature side radiator 300, and the fan 400 are arranged in this order in an airflow direction such that air which is subjected to heat exchange passes therethrough.

In the present embodiment, the subcooler 260 of the condenser 1200 is arranged to overlap, in the airflow direction, with the upper path 1100a of the low-temperature side radiator 1100. Accordingly, after passing through the upper path 1100a of the low-temperature side radiator 1100, the air passes through the downstream path 200b, or in other words, the subcooler 260, of the condenser 1200. More specifically, the entirety of the subcooler 260 according to the present embodiment overlaps, in the airflow direction, with at least a part of the upper path 1100a of the low-temperature side radiator 1100. Furthermore, the subcooler 260 according to the present embodiment does not overlap, in the airflow direction, with the lower path 1100b of the low-temperature side radiator 1100.

In the configuration described above, after passing through the lower path 1100b of the low-temperature side radiator 1100 and being cooled, the coolant flows into the upper path 1100a. Here, after passing through the upper path 1100a, the air passes through the subcooler 260 of the condenser 1200. Accordingly, high-temperature air can be prevented from passing through the subcooler 260, and thus the subcooling performance of the subcooler 260 can be maintained.

In the present embodiment, the low-temperature side radiator 1100 may be replaced with a heat exchanger in which the inlet port 101 is located in the lower portion, the outlet port 102 is located in the upper portion, and a middle-stage path, such as the path described in the third embodiment and the fourth embodiment, is provided.

In addition, the low-temperature side radiator 1100 and the condenser 1200 according to the present embodiment can be arranged as described in the second embodiment.

Other Embodiments

Hereinbefore, the preferred embodiments of the present disclosure are described. However, the present disclosure is not intended to be limited to the embodiments described above, and various modifications can be made as long as they do not depart from the gist thereof. The structures of the embodiments described above are merely examples and the scope of the present disclosure is not intended to be limited to the scope described above. In the first embodiment to the fourth embodiment described above, an example in which the subcooler 260 does not overlap, in the airflow direction, with the upper path 100a of the low-temperature side radiator 100 and, further, the subcooler 260 overlaps, in the airflow direction, with the entirety of the lower path 100b of the low-temperature side radiator 100 is described. However, the present disclosure is not limited to the embodiments described above. The subcooler 260 may overlap, in the airflow direction, with at least a part of the lower path 100b of the low-temperature side radiator 100. It is contemplated that the operational effect described above can be obtained even if approximately half the subcooler 260 overlaps, in the airflow direction, with at least a part of the lower path 100b of the low-temperature side radiator 100. In addition, it is conceived that the operational effect described above can be obtained even if the subcooler 260 overlaps, in the airflow direction, with a part of the upper path 100a of the low-temperature side radiator 100. This is shared by the fifth embodiment.

In the low-temperature side radiator 100 of the embodiments described above, each upper tube 130a includes the inner fin 130f and each lower tube 130b has a single coolant flow channel. However, the configuration is not limited to the embodiment described above. Each upper tube 130a may not include the inner fin 130f and may have a single coolant flow channel. Furthermore, each lower tube 130b may include an inner fin. In addition, the cross-sectional area of the lower tubes 130b may be set to be larger than that of the upper tubes 130a. In this case, the coolant rapidly flows out through the lower tubes 130b, and thus thermal influence of the condenser 200 on the subcooler 260 can be further reduced.

In the embodiments described above, the high-temperature side radiator 300 has an I-shaped flow structure. However, the configuration is not limited thereto. The high-temperature side radiator 300 may have, for example, a U-turn cross-flow structure, similar to the low-temperature side radiator 100.

In the embodiments described above, the low-temperature side radiator 100 is used for cooling the intercooler 180 of the supercharger 181. However, the configuration is not limited thereto. The low-temperature side radiator 100 may be used for cooling other heat generation units, such as an inverter device for cooling a drive motor which is mounted on, for example, a hybrid vehicle or an electric vehicle.

In the embodiments described above, each upper tube 130a of the low-temperature side radiator 100 includes the inner fin 130f as a heat exchange efficiency improvement member. However, the configuration is not limited thereto. Each of the plurality of upper tubes 130a may be an extrusion tube which is formed by extrusion molding. In this case, a heat exchange efficiency improvement member may be an inner member which is formed in the extrusion tubes during extrusion molding. The extrusion tubes is produced in such a way that a metallic material, such as an aluminum alloy, is extruded through a metal mold and, when the extrusion molding is performed, the inner member having, for example, a plate shape, is formed in the tubes at the same time.

Each of the plurality of upper tubes 130a may be a dimple tube having circular concave portions formed in the surface thereof. In this case, the heat exchange efficiency improvement members may be these concave portions. A dimple tube is a tubular member produced by joining plate members which are formed of, for example, an aluminum alloy, and have a plurality of circular concave portions formed by pressing. In the dimple tubes produced as described above, a plurality of circular concave portions are provided in either an outer surface or an inner surface thereof or in both the outer surface and the inner surface. Even in such a configuration, the upper tubes 130a can be allowed to have a relatively large surface area, compared to a flat tube. Thus, efficiency of heat exchange between the upper tubes 130a and the air can be increased. In addition, the lower tubes 130b may be extrusion tubes or dimple tubes.

What is claimed is:

1. A vehicle heat exchanger, comprising:
a low-temperature side radiator that exchanges heat between a first coolant and air to cool the first coolant;
a condenser that exchanges heat between a refrigerant of a refrigeration cycle and the air to cool the refrigerant; and
a high-temperature side radiator that exchanges heat between a second coolant and the air to cool the second coolant, the second coolant having a higher temperature than the first coolant that is cooled by the low-temperature side radiator, wherein
the low-temperature side radiator, the condenser, and the high-temperature side radiator are aligned in an airflow direction such that the air for heat exchange passes therethrough,
the low-temperature side radiator includes
an inflow portion into which the first coolant flows,
an upstream path, the first coolant flowing, from the inflow portion into the upstream path, to pass through the upstream path, the upstream path cooling the first coolant by exchanging heat between the first coolant and the air,
a downstream path that is located downstream, in a coolant flowing direction, from the upstream path, the downstream path exchanging heat between the first coolant, which passed through the upstream path, and the air to further cool the first coolant, and
an outlet portion, the first coolant, which passed through the downstream path, flowing out of the outlet portion,
the condenser includes
a condenser core that exchanges heat between the refrigerant and the air to cool the refrigerant, and
a subcooler that is located downstream, in a refrigerant flowing direction, from the condenser core, the subcooler exchanging heat between the refrigerant, which passed through the condenser core, and the air to subcool the refrigerant, and
the subcooler overlaps, in the airflow direction, with at least a portion of the downstream path.

2. A vehicle heat exchanger comprising:
a low-temperature side radiator that exchanges heat between a first coolant and air to cool the first coolant;
a condenser that exchanges heat between a refrigerant of a refrigeration cycle and the air to cool the refrigerant; and
a high-temperature side radiator that exchanges heat between a second coolant and the air to cool the second coolant, the second coolant having a higher temperature than the first coolant that is cooled by the low-temperature side radiator, wherein
the low-temperature side radiator, the condenser, and the high-temperature side radiator are aligned in an airflow direction such that the air for heat exchange passes therethrough,
the low-temperature side radiator includes
an inflow portion that is located in an upper portion of the low-temperature side radiator,
an upper path that is in communication with the inflow portion, the upper path constituting a coolant flow channel and exchanging heat between the first coolant and the air to cool the first coolant,
a lower path that is located below the upper path, the lower path constituting a coolant flow channel and exchanging heat between the first coolant, which passed through the upper path, and the air to further cool the first coolant, and
an outlet portion that is located in a lower portion of the low-temperature side radiator, the outlet portion in communication with the lower path,
the condenser includes a condenser core that exchanges heat between the refrigerant and the air to cool and condense the refrigerant, thereby changing the refrigerant into liquid phase, and a subcooler that is located below the condenser core, the subcooler exchanging heat between the liquid-phase refrigerant, which flowed in from the condenser core, and the air to subcool the liquid-phase refrigerant, and the subcooler overlaps, in the airflow direction, with at least a portion of the lower path.

3. The vehicle heat exchanger according to claim 1, wherein
in the airflow direction, the low-temperature side radiator, the condenser, and the high-temperature side radiator are aligned in this order.

4. The vehicle heat exchanger according to claim 1, wherein,
in the airflow direction, the condenser, the low-temperature side radiator, and the high-temperature side radiator are aligned in this order.

5. The vehicle heat exchanger according to claim 2, wherein
the upper path includes a plurality of upper tubes,
each of the plurality of upper tubes includes a heat-exchange efficiency improvement member that improves efficiency of heat exchange with the air,
the lower path includes a plurality of lower tubes, and
each of the plurality of lower tubes has a single coolant flow channel.

6. The vehicle heat exchanger according to claim 2, wherein
the low-temperature side radiator further includes a middle-stage path that is located between the upper path and the lower path, and
the low-temperature side radiator defines a flow path in which the first coolant flows through the inflow portion, the upper path, the middle-stage path, the lower path, and then the outlet portion, in this order.

7. The vehicle heat exchanger according to claim 2, wherein
the low-temperature side radiator further includes a middle-stage path and a middle-lower stage path, the middle-stage path and the middle-lower stage path being located between the upper path and the lower path,
the middle-lower stage path is located below the middle-stage path, and
the low-temperature side radiator defines a flow path in which the first coolant flows through the inflow portion, the upper path, the middle-stage path, the middle-lower stage path, the lower path, and then the outlet portion, in this order.

8. The vehicle heat exchanger according to claim 2, wherein
the subcooler defines a refrigerant flow channel, and
the first coolant flowing through the coolant flow channel of the lower path and the refrigerant flowing through the refrigerant flow channel of the subcooler flow in the same direction.

9. The vehicle heat exchanger according to claim 2, wherein
the subcooler does not overlap with the upper path in the airflow direction.

10. The vehicle heat exchanger according to claim 2, wherein
an entirety of the subcooler overlaps, in the airflow direction, with the at least a portion of the lower path.

11. The vehicle heat exchanger according to claim 1, wherein
the low-temperature side radiator is included in a low-temperature side coolant cycle that circulates the first coolant for cooling a first heat generation unit,
the high-temperature side radiator is included in a high-temperature side coolant cycle that circulates the second coolant for cooling a second heat generation unit, and
a coolant circuit formed by the low-temperature side coolant cycle and a coolant circuit formed by the high-temperature side coolant cycle are independent of each other.

12. The vehicle heat exchanger according to claim 11, wherein
the first heat generation unit is an intercooler of a supercharger for an internal combustion engine, and
the second heat generation unit is the internal combustion engine.

13. The vehicle heat exchanger according to claim 5, wherein
the heat-exchange efficiency improvement member is an inner fin that partitions an interior of the plurality of upper tubes and extends in a longitudinal direction of the plurality of upper tubes.

14. The vehicle heat exchanger according to claim 5, wherein
each of the plurality of upper tubes is an extrusion tube that is formed by extrusion molding, and
the heat-exchange efficiency improvement member is an inner member formed in the extrusion tubes during the extrusion molding.

15. The vehicle heat exchanger according to claim 5, wherein
each of the plurality of upper tubes is a dimple tube having a circular concave portion formed in a surface of the each of the plurality of upper tubes, and
the heat-exchange efficiency improvement member is the concave portion.

16. The vehicle heat exchanger according to claim 1, wherein
the subcooler does not overlap, in the airflow direction, with the upstream path.

17. The vehicle heat exchanger according to claim 1, wherein
an entirety of the subcooler overlaps, in the airflow direction, with the at least a portion of the downstream path.

* * * * *